US009926012B2

(12) United States Patent
Makowski et al.

(10) Patent No.: US 9,926,012 B2
(45) Date of Patent: Mar. 27, 2018

(54) VEHICLE FRAME INCLUDING BRACKET FOR SMALL OFFSET RIGID BARRIER TEST

(71) Applicant: Ford Global Technologies, LLC, Dearborn, MI (US)

(72) Inventors: Matthew B. Makowski, Northville, MI (US); Jayanth Kumar Basavalingiah, West Bloomfield, MI (US); Jamil M. Alwan, Ann Arbor, MI (US); Tanveer Pasha Mahaboob Sab, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 15/007,611

(22) Filed: Jan. 27, 2016

(65) Prior Publication Data

US 2017/0210424 A1    Jul. 27, 2017

(51) Int. Cl.
| | |
|---|---|
| *B62D 21/15* | (2006.01) |
| *B60R 16/023* | (2006.01) |
| *B60R 19/48* | (2006.01) |
| *B60R 19/34* | (2006.01) |
| *B60R 19/24* | (2006.01) |

(52) U.S. Cl.
CPC ........ *B62D 21/152* (2013.01); *B60R 16/0231* (2013.01); *B60R 19/48* (2013.01); *B62D 21/155* (2013.01); *B60R 19/34* (2013.01); *B60R 2019/247* (2013.01)

(58) Field of Classification Search
CPC ... B62D 21/152; B62D 16/0231; B62D 19/48
USPC ............ 296/187.09, 187.1, 26.13; 293/117
See application file for complete search history.

(56) References Cited

U.S. PATENT DOCUMENTS

| | | | |
|---|---|---|---|
| 5,915,774 A * | 6/1999 | Tiedge | ...................... B60P 3/34 296/175 |
| 6,695,393 B1 | 2/2004 | Aouadi et al. | |
| 8,985,258 B1 | 3/2015 | Midoun et al. | |
| 9,120,507 B1 | 9/2015 | Alwan et al. | |
| 2006/0261638 A1 | 11/2006 | Smith et al. | |
| 2010/0140965 A1 | 6/2010 | Schoenberger et al. | |
| 2013/0328334 A1 | 12/2013 | Hoiss et al. | |

(Continued)

OTHER PUBLICATIONS

GB Search Report dated Jun. 23, 2017.

*Primary Examiner* — Joseph D. Pape
(74) *Attorney, Agent, or Firm* — Frank A MacKenzie; Bejin Bieneman PLC

(57) ABSTRACT

A vehicle frame includes a first frame rail and a second frame rail spaced from each other. A casing is supported by the first frame rail, and elongated in a direction extending away from the second frame rail. The casing is deformable relative to the first frame rail, and houses an electronic component. During a vehicle small offset frontal impact, the casing moves from an initial position to a deflected position, deflecting some of the load of the impact away from backup structures of the vehicle. In the deflected position, the casing may also contact a front portion of a wheel, positioning the front portion of the wheel inboard the frame of the vehicle relative to a rear portion of the wheel, which may minimize the load transferred to the backup structures and/or detach the wheel from the vehicle to minimize the possibility of intrusion into the backup structures.

16 Claims, 7 Drawing Sheets

(56) References Cited

U.S. PATENT DOCUMENTS

2014/0062129 A1 3/2014 Syed et al.
2015/0175110 A1 6/2015 Kalandek et al.
2017/0021790 A1 1/2017 Young

* cited by examiner though major structural components of the vehicle, such as front rails and subframe longitudinal members. As a result, these major structural components do not absorb energy effectively during the impact. Rather, the load path of the offset impact can travel through a bumper beam to backup structures behind a wheel of the vehicle. The backup structures include, for example, a floor, a dash, and a hinge pillar of the vehicle. The impact load is directed along this load path and the energy of the impact is absorbed along this load path.

VEHICLE FRAME INCLUDING BRACKET FOR SMALL OFFSET RIGID BARRIER TEST

BACKGROUND

During a small offset frontal impact of a vehicle, the impact is offset from major structural components of the vehicle. Offset frontal impacts can be simulated with a small offset rigid barrier ("SORB") frontal crash test. The Insurance Institute for Highway Safety ("IIHS") sets a standard for a SORB frontal crash tests. In a SORB frontal crash test, the vehicle impacts a rigid barrier at 40 miles/hour with 25% of an outer portion of the front end of the vehicle overlapping the rigid barrier.

The impact contact surface during a small offset frontal impact is offset from the major structural components of the vehicle, such as front rails and subframe longitudinal members. As a result, these major structural components do not absorb energy effectively during the impact. Rather, the load path of the offset impact can travel through a bumper beam to backup structures behind a wheel of the vehicle. The backup structures include, for example, a floor, a dash, and a hinge pillar of the vehicle. The impact load is directed along this load path and the energy of the impact is absorbed along this load path.

During the small offset frontal impact, the bumper beam moves rearward. The wheel of the vehicle can bridge the load path between the bumper beam and the backup structures as the bumper beam moves rearward into the wheel and forces the wheel to move into the backup structures. Since the wheel bridges the load path, the orientation of the wheel affects the load path and the energy absorption during the frontal impact. When the wheel is oriented with a front portion of the wheel being positioned outboard relative to a rear portion of the wheel, the wheel is trapped between the bumper beam and the backup structures and may disadvantageously cause the wheel to intrude into the floor, dash or hinge pillar of the vehicle. Intrusion of the wheel into the floor, dash or hinge pillar of the vehicle are metrics that are recorded in the IIHS SORB frontal crash test.

When the vehicle is deflected in a lateral direction during the impact, some of the energy of the impact may be redirected away from the backup structures. Moreover, when the wheel is oriented with the front portion of the wheel being positioned inboard relative to the rear portion of the wheel, the magnitude of load transferred to the backup structures may be minimized, and the possibility of intrusion of the wheel into the floor, dash or hinge pillar reduced. Orientation of the wheel with the front portion of the wheel inboard may result in better structural ratings and overall ratings in the IIHS SORB frontal crash test.

Accordingly, there remains an opportunity to design a system that deflects the energy from the impact away from the backup structures, and, in addition, orients the wheel with a front portion of the wheel inboard to help minimize the magnitude of load transferred to the backup structures, decreasing the possibility of intrusion of the wheel into the floor, dash or hinge pillars.

DETAILED DESCRIPTION

Figure 4:
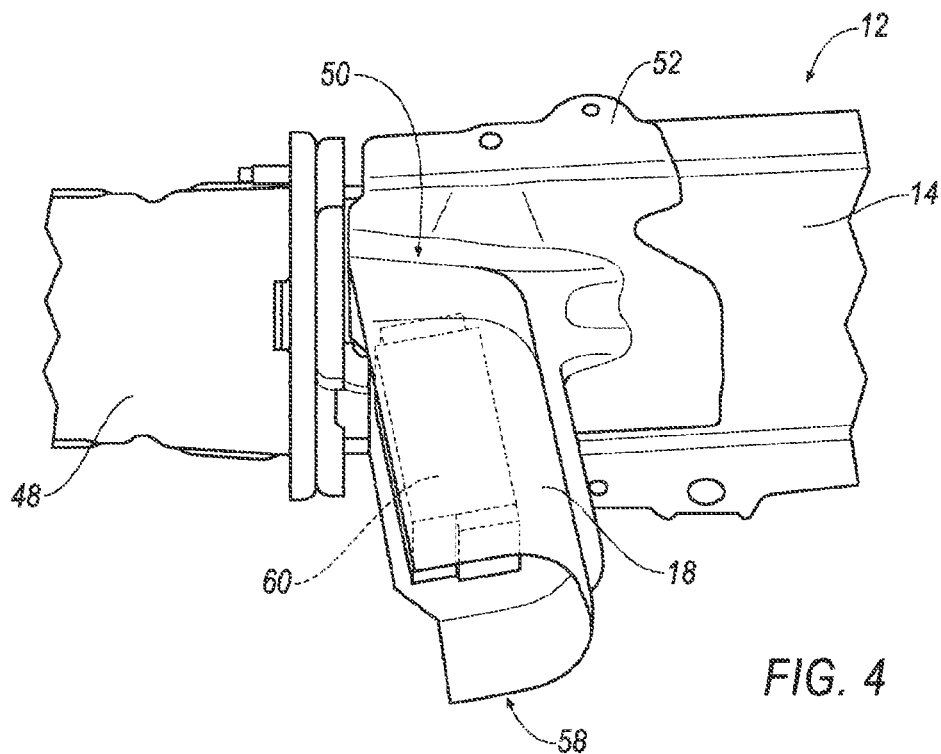
FIG. 4 is a perspective view of the casing in FIG. 2, including a powertrain control module shown in hidden lines.
Figure 5:
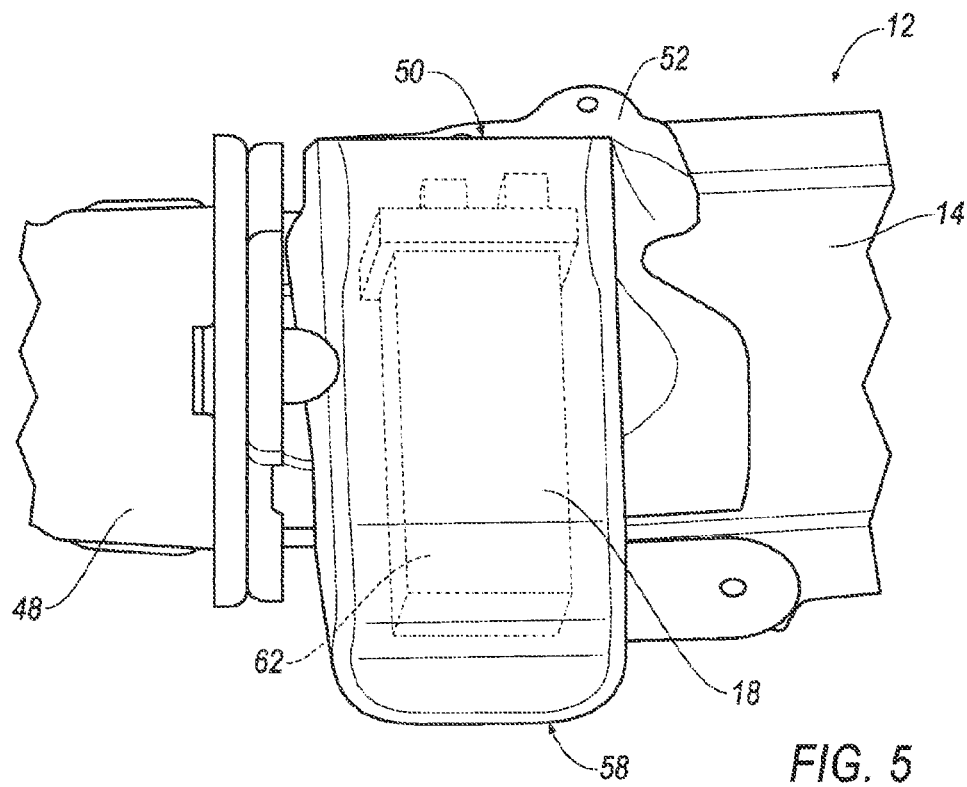
FIG. 5 is a perspective view of the casing in FIG. 3, including a positive temperature coefficient heater shown in hidden lines.

With reference to the Figures, wherein like numerals indicate like parts throughout the several views, a vehicle 10 includes a frame 12 including a first frame rail 14 and a second frame rail 16 that are spaced from each other. A casing 18 housing an electrical component 20 (see FIGS. 4 and 5) is supported by the first frame rail 14 in an initial position. The casing 18 is elongated in a direction D (see FIGS. 2 and 3) extending from the first frame rail 14 and away from the second frame rail 16. The casing 18 is deformable relative to the first frame rail 14.

Figure 7:
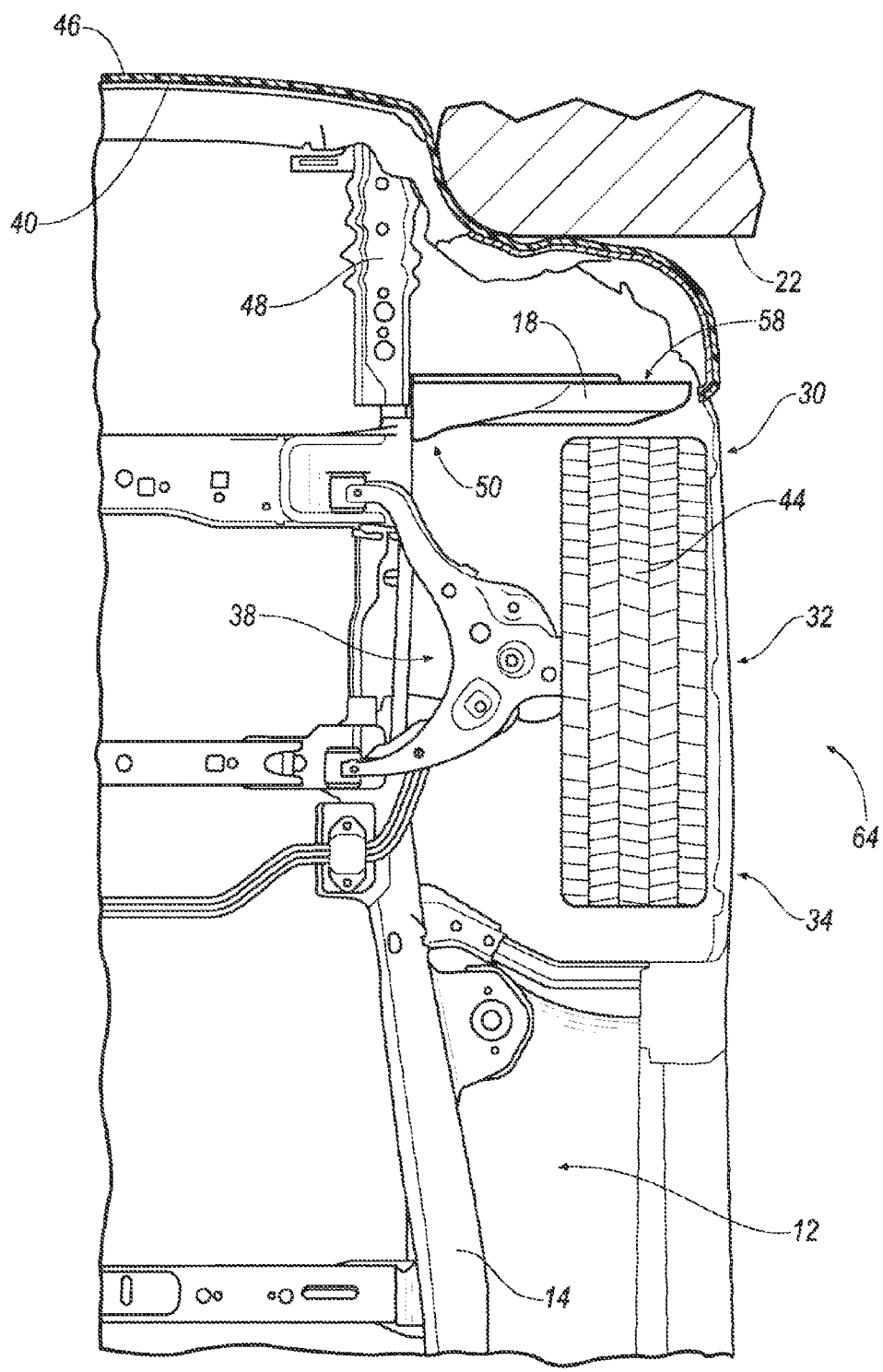
FIG. 7 is a bottom view of the front end of the vehicle during the SORB frontal crash test after the rigid barrier contacts the bumper beam but before the SORB contact deflects the casing of FIG. 2.
Figure 8:
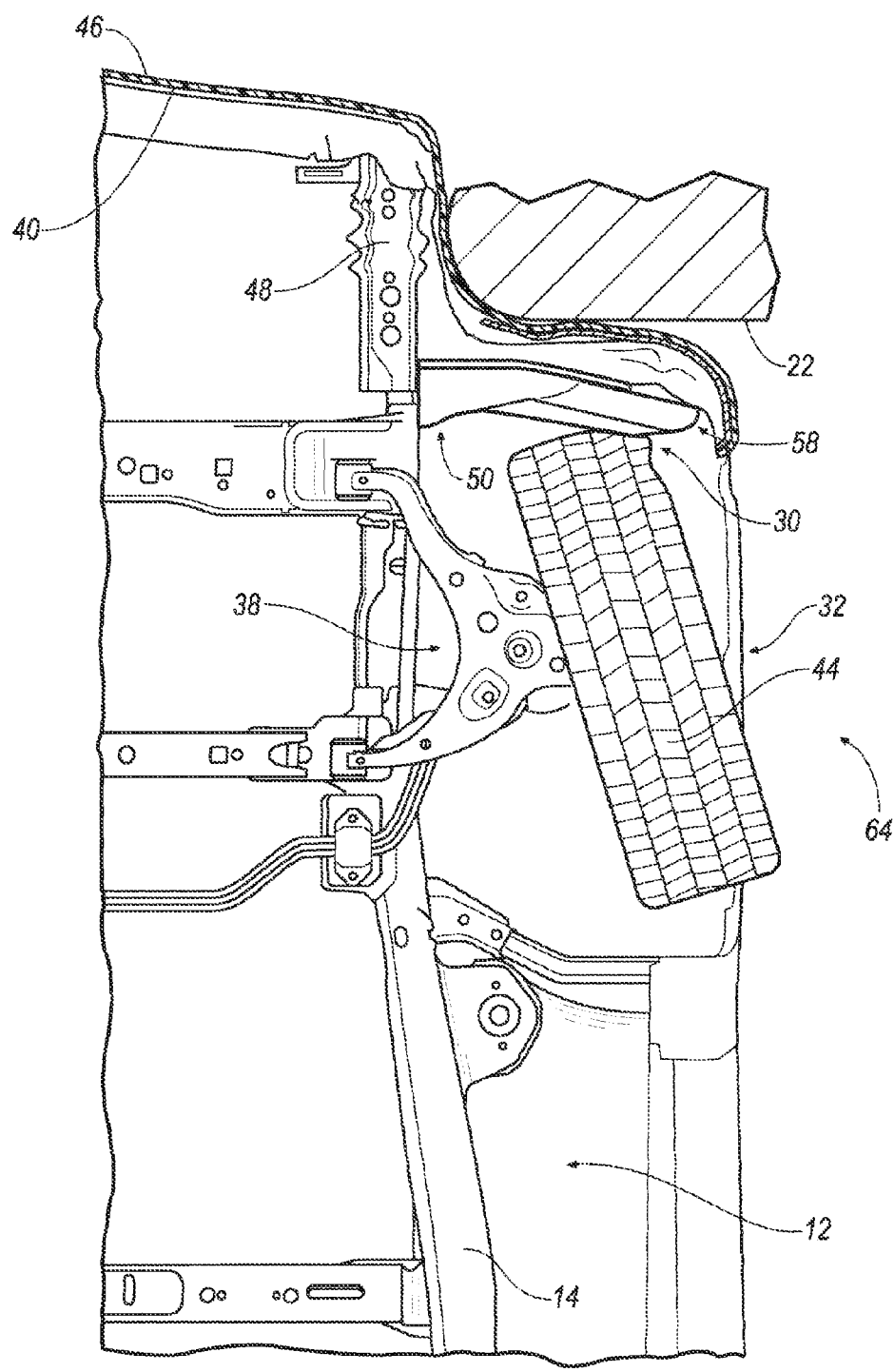
FIG. 8 is a bottom view of the front end of the vehicle during the SORB frontal crash test after the rigid barrier contact deflects the casing of FIG. 2 into a deflected position against a wheel to move a front portion of the wheel inboard.

During an impact with an object 22 such as a rigid barrier of a small offset rigid barrier ("SORB") frontal crash test, the impact of the object 22 with the vehicle 10 moves the casing 18 toward a deflected position, as shown in FIGS. 7 and 8. That is, the casing 18 is moved to the deflected position as a result of the impact. In other words, the casing 18 may also be referred to as a SORB bracket. In addition, since the casing 18 houses the electrical component 20 that may otherwise have to be located elsewhere in the vehicle 10, such as underhood, vehicle design is simplified, a part can be removed from the vehicle assembly process, and vehicle weight and cost are further reduced.

When the casing 18 is moved toward the deflected position by the impact of the object 22 with the vehicle 10, the casing 18 may deflect the vehicle 10 in a lateral direction, redirecting some of the energy of the impact away from backup structures 24 of the vehicle 10, such as a floor 26, a dash (not shown) and a hinge pillar 28.

Moreover, as shown in FIG. 8, the casing 18 may contact a front portion 30 of a wheel 32. As a result, the front portion 30 of the wheel 32 moves toward the first frame rail 14 relative to a rear portion 34 of the wheel 32. In this position, the wheel 32 is oriented to diminish the magnitude of the load from the impact that is transferred to the backup structures 24. The risk that the wheel 32 may intrude into a passenger compartment 36 of the vehicle 10 is also decreased. In this position, the wheel 32 may also detach from the vehicle 10. This may also decrease the magnitude of the load from the impact that is transferred to the backup structures 24, and the risk that the wheel 32 will intrude into the passenger compartment 36.

Referring back to FIGS. 2 and 3, the frame 12 of the vehicle 10 may be of any type, e.g., unibody, body-on-frame, etc., and is formed of any suitable material, such as steel, aluminum, etc. The frame 12 of the vehicle 10 includes the first frame rail 14 and the second frame rail 16. The frame 12 supports numerous components such as, for example, a steering and suspension system 38, a bumper beam 40, and the casing 18.

Figure 1:
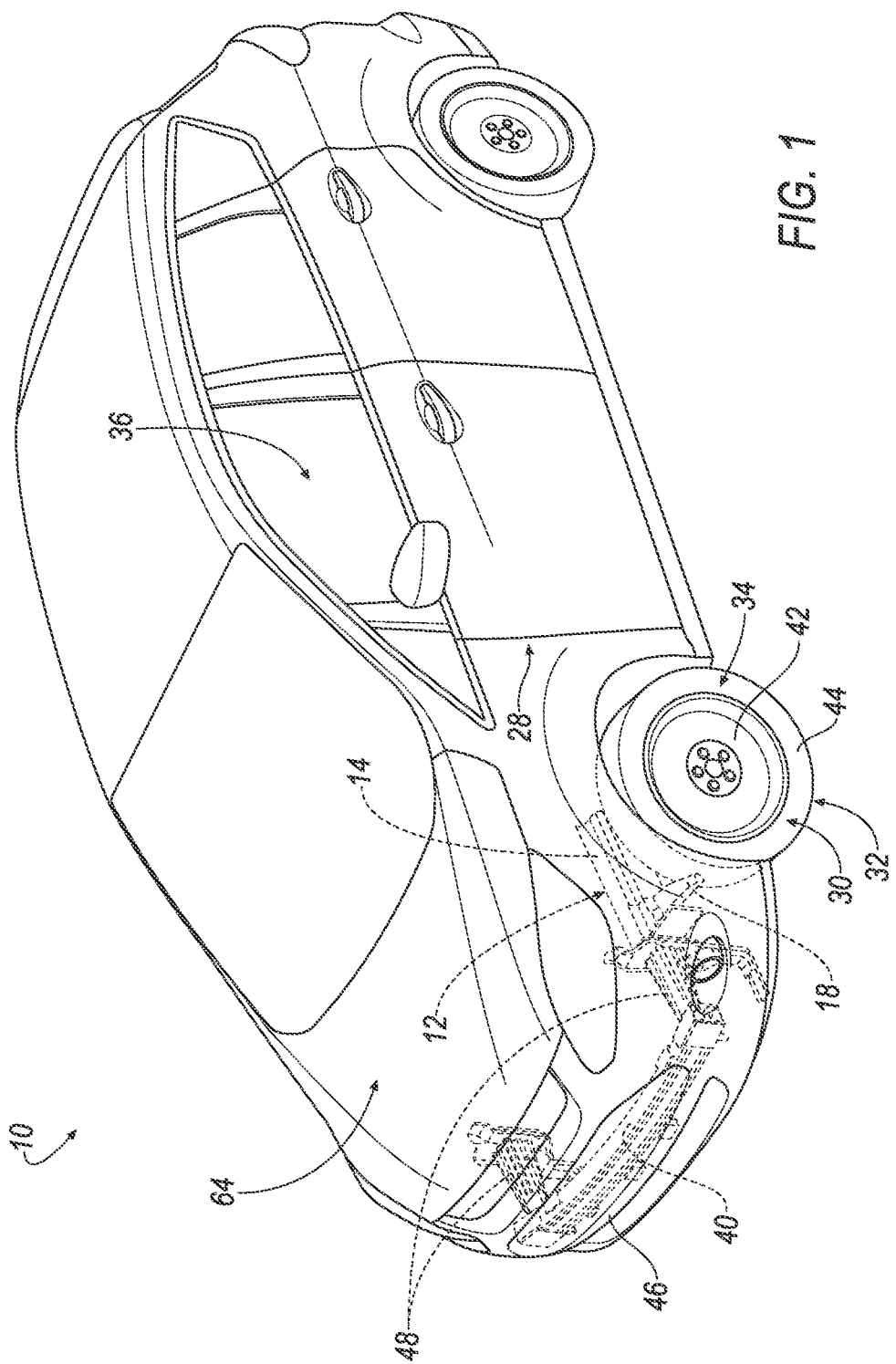
FIG. 1 is a perspective view of a vehicle including a portion of a frame, a casing, members and a bumper beam shown in hidden lines.

The steering and suspension system 38 supports the wheel 32. As shown in FIG. 1, the wheel 32 includes a rim 42 that is may be formed of metal. A tire 44, which may be formed of rubber, is disposed on the rim 42. The wheel may be of any type.

The bumper beam 40 may be formed of metal, such as steel or aluminum, and supports a front fascia 46 of the vehicle 10. The bumper beam 40 may deform during frontal impact, as reflected in FIGS. 7 and 8. Alternatively, the bumper beam 40 may remain rigid during frontal impact.

Figure 2:
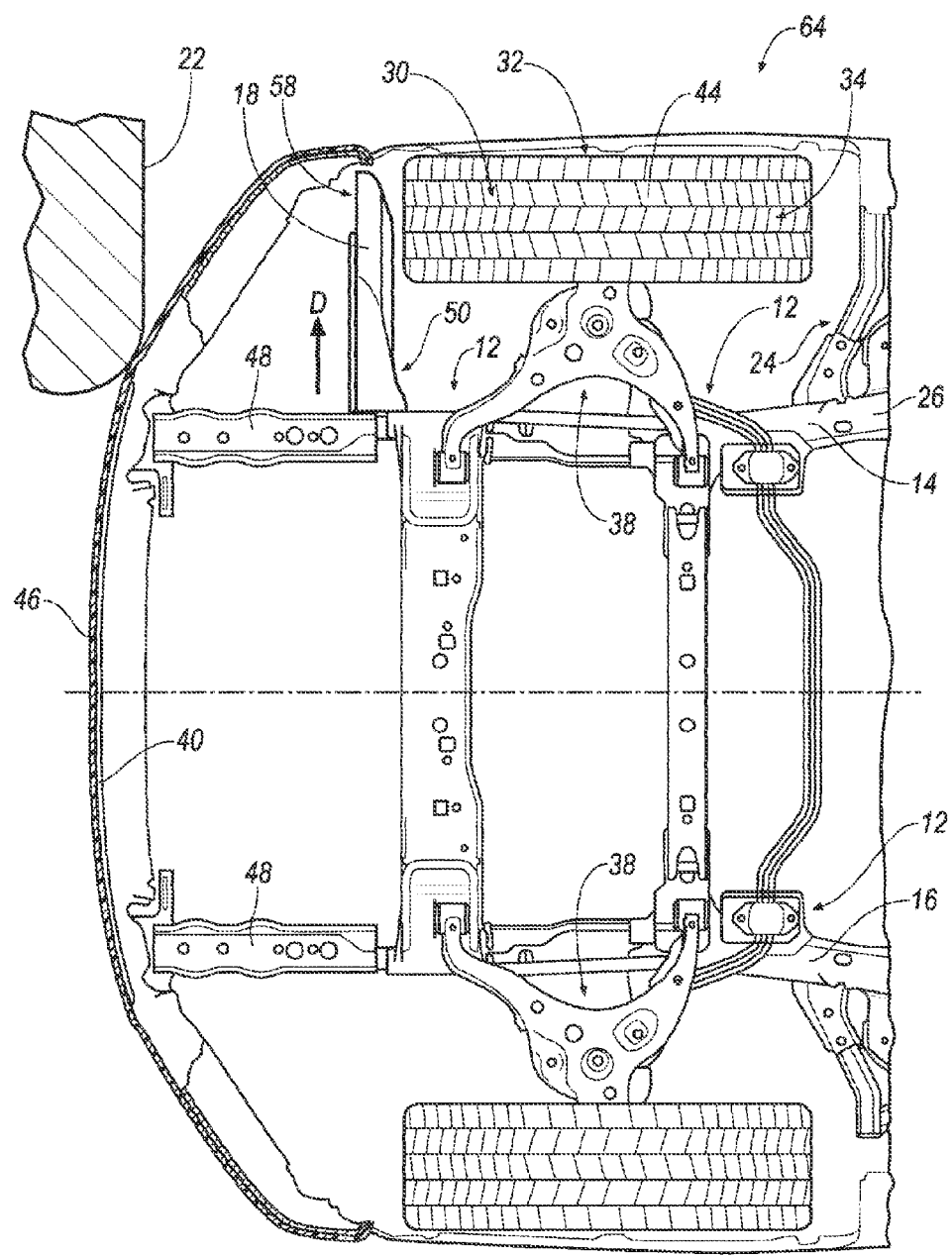
FIG. 2 is a bottom view of a front end of the vehicle during a small offset rigid barrier ("SORB") frontal crash test just as a rigid barrier contacts a front end of the vehicle, and shows one embodiment of the casing in an initial position.
Figure 3:
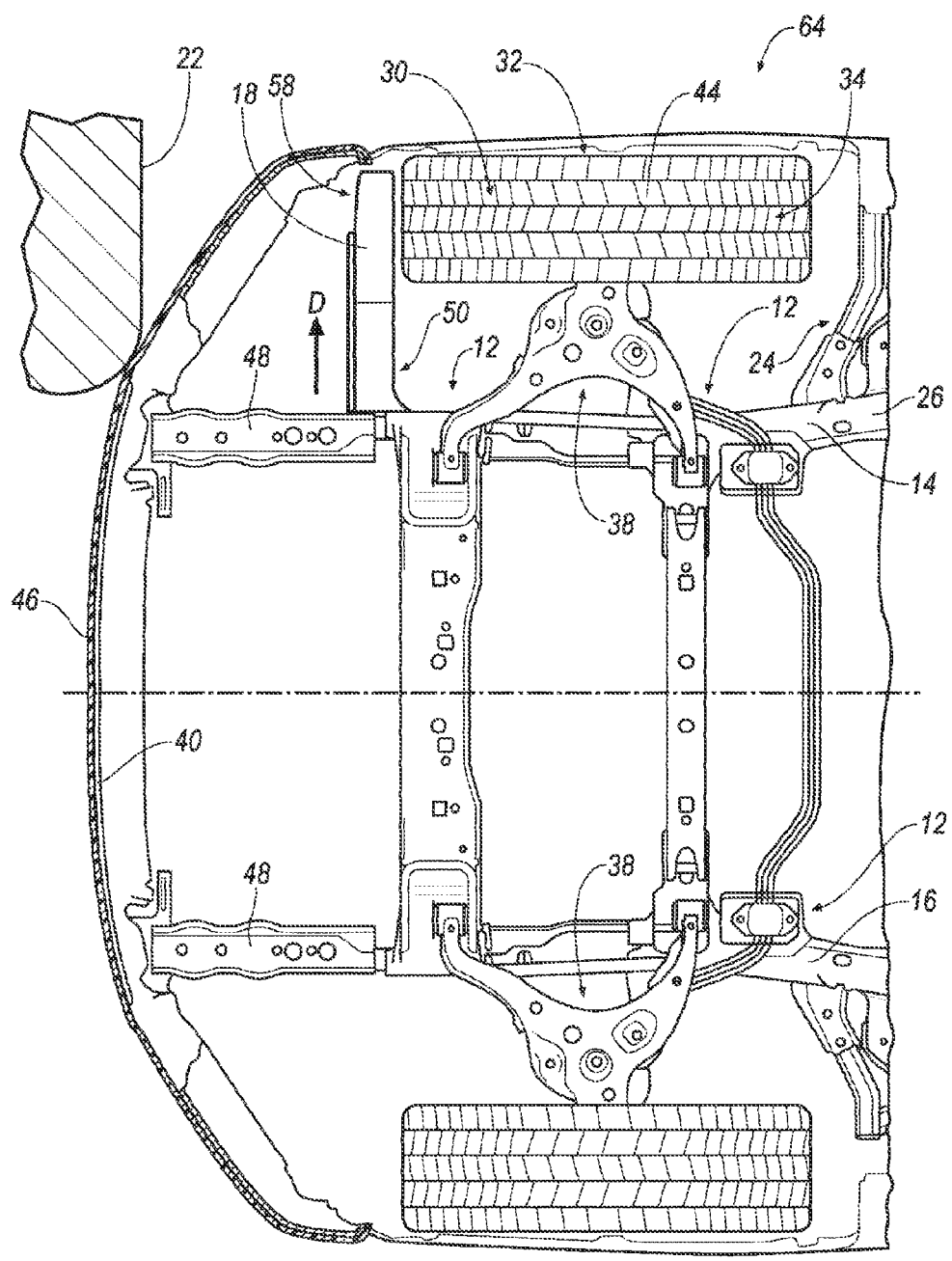
FIG. 3 is a bottom view of a front end of the vehicle during a SORB frontal crash test before just as the rigid barrier contacts the front end of the vehicle, and shows another embodiment of the casing in the initial position.

The bumper beam 40 may be supported on the frame 12 by one or more members 48. In particular, as shown in FIGS. 1-3, two members 48 extend between the frame 12 and the bumper beam 40 to support the bumper beam 40 on the frame 12. The members 48 can be connected to the bumper beam 40 and the frame 12 in any suitable manner.

The members 48 may be constructed of metal or other suitable materials, and generally include an energy absorbing function. For example, the members 48 may be crush cans. The members 48 may buckle during a frontal impact against the bumper beam 40 to absorb energy from the frontal impact from the object 22, as shown in FIGS. 7 and 8.

As set forth above, the casing 18 may be supported by the first frame rail 14. In other words, the casing 18 may be directly or indirectly connected to the first frame rail 14. For example, a first end 50 of the casing 18 can be fixed to a bracket 52. The first end 50 of the casing 18 may be fixed to the bracket 52 in any suitable manner, such as welding. Alternatively, the bracket 52 may be integral with the casing 18, i.e., formed simultaneously with the casing as a single continuous unit.

Figure 6:
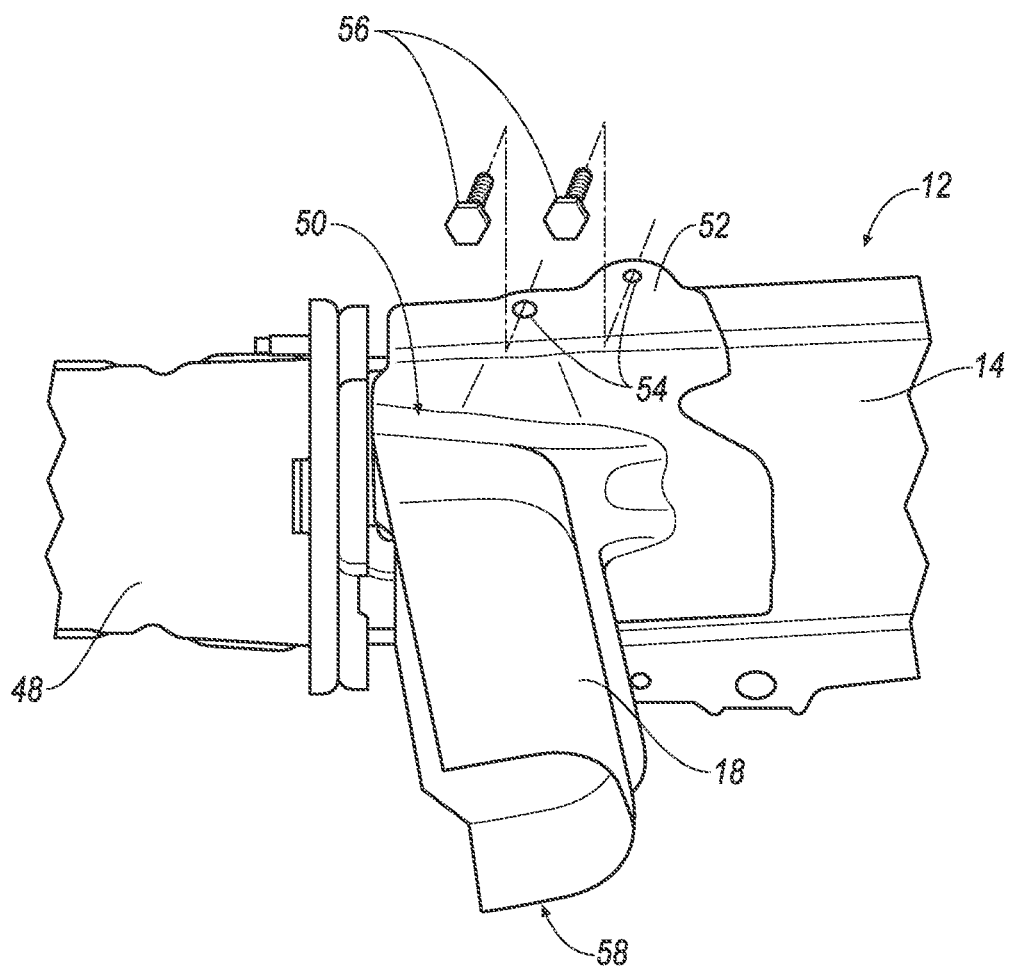
FIG. 6 is a perspective view of the casing from FIG. 2, including a bracket fixed to a first end of the casing, the bracket defining holes though which threaded bolts can extend to mount the casing to the frame of the vehicle.

Alternatively, the bracket 52 may be removably mounted to the frame 12. By way of example, with reference to FIG. 6, the bracket 52 can define a plurality of holes 54. The frame 12 of the vehicle 10 may also define holes (not shown) that align with the holes 54 of the bracket 52. Fasteners, such as M10 threaded bolts 56, can extend through the holes 54 of the bracket 52 and into the aligned holes of the frame (not shown) to removably mount the bracket 52 to the frame 12 of the vehicle 10. The bracket 52 may alternatively be welded to or otherwise fixedly joined to the frame 12 in a suitable manner. The bracket 52 may be formed of metal, e.g., high-strength steel. In the alternative to the bracket 52, the casing 18 may be directly fixed to the first frame rail 14 by welding, fastening, etc.

Referring back to the casing 18, the casing 18 is elongated in the direction D extending from the first frame rail 14 and away from the second frame rail 16, as shown in FIGS. 2, 3, 7 and 8. Specifically, the casing 18 may extend from the first end 50 to a second end 58 spaced from the first end in the direction D, and the casing 18 may be elongated from the first end 50 to the second end 58.

The casing 18 may be cantilevered from the frame 12. In other words, the first end 50 of the casing 18 may be fixed relative to the first frame rail 14, i.e., directly or indirectly fixed to the first frame rail 14, and the second end 58 of the casing 18 may be free, i.e., unsupported, from the first end 50 to the second end 58. Alternatively, the second end 58 of the casing 18 may be attached to or supported by another structure, such as the bumper beam 40.

As set forth above, the casing 18 is elongated in the direction D extending from the first frame rail 14 and away from the second frame rail 16. In other words, the direction D is outboard of the first frame rail 14. The first frame rail 14 is disposed between the casing 18 and the second frame rail 16.

As set forth above, the casing 18 houses the electrical component 20. The electrical component 20 may, for example, receive and/or provide instructions for controlling operation of components of the vehicle 10. The electrical component 20 may include a processor, memory, sensors, etc. The electrical component 20 may include hardware such as circuit boards, electrical connectors, wires, etc. For example, in one embodiment shown in FIG. 4, the electrical component 20 is a powertrain control module 60, shown in hidden lines. In another embodiment shown in FIG. 5, the electrical component 20 is a positive temperature coefficient heater 62, shown in hidden lines. Alternatively, the electrical component 20 may be of any suitable type.

Since the electrical component 20 is disposed in the casing 18 outboard of the first frame rail 14, the electrical component 20 does not consume crushable space in a front end 64 of the vehicle 10. This crushable space can absorb energy from the frontal impact.

The casing 18 may be constructed from suitable materials such as plastic, composite materials, and metals such as steel, aluminum and the like. The casing 18 may include ribs or other structures (not shown) to strengthen the casing 18 and/or to tune the degree and location of the bending.

The casing 18 and/or the bracket 52 may be designed to deform, e.g., to bend, relative to the first frame rail 14. For example, the casing 18 and/or the bracket 52 may be designed of a material type, wall thickness, and/or shape to deform, e.g., to bend, relative to the first frame rail 14.

The operation of the casing 18 during a small offset frontal impact is shown in FIGS. 7 and 8. In the initial position, the first end 50 of the casing 18 is proximal the frame 12, and the casing 18 extends to the second end 58 between the bumper beam 40 and the wheel 32. Alternatively, the second end 58 of the casing 18 may be in contact with the bumper beam 40, or another structure of the vehicle 10.

As shown in FIG. 7, during the impact, the object 22 may deform the bumper beam 40. One or more of the members 48 supporting the bumper beam 40 on the frame 12 may buckle, absorbing energy from the impact. As the impact of the object 22 continues, the casing 18 begins to move from the initial position to the deflected position. In the process, the casing 18 may deflect the vehicle in a lateral direction, deflecting energy away from the backup structures 24, such as the floor 26, the dash (not shown) and the hinge pillar 28, while also absorbing energy in moving from the initial position to the deflected position.

As shown in FIG. 8, when in the deflected position, the casing 18 may contact the front portion 30 of the wheel 32. The front portion 30 of the wheel 32 moves toward the first frame rail 14 relative to a rear portion 34 of the wheel 32.

In this position, the wheel 32 is oriented to diminish the magnitude of the load from the impact that is transferred to the backup structures 24. The risk that the wheel 32 may intrude into the passenger compartment 36 of the vehicle 10 is also lessened.

The wheel 32 may also detach from the vehicle 10 as a result of the casing 18 contacting the front portion 30 of the wheel 32 in the manner described above, which may also decrease the magnitude of the load from the impact that is transferred to the backup structures 24, and the risk that the wheel 32 will intrude into the passenger compartment 36.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A vehicle frame comprising:
   a first frame rail and a second frame rail spaced from each other;
   a casing supported by the first frame rail, the casing being deformable relative to the first frame rail,
   an electronic component housed in the casing, the electronic component including one of a powertrain control module and a positive temperature coefficient heater; and
   the casing elongated in an outboard direction extending from the first frame rail and away from the second frame rail.

2. The vehicle frame of claim 1 wherein the casing is cantilevered from the first frame rail.

3. The vehicle frame of claim 1 wherein the casing is comprised of metal.

4. The vehicle frame of claim 1 wherein the casing is comprised of steel.

5. The vehicle frame of claim 1 wherein the casing is comprised of aluminum.

6. The vehicle of claim 1 further comprising a bracket fixed to the casing and fixed to the first frame rail.

7. The vehicle of claim 6 wherein the bracket is comprised of steel.

8. The vehicle of claim 6 wherein the bracket is removably mounted to the first frame rail.

9. The vehicle frame of claim 8 wherein the bracket defines at least one fastener hole.

10. A vehicle comprising:
    a frame;
    a wheel coupled to the frame;
    a bumper beam coupled to the frame;
    a casing supported by the frame and disposed between the wheel and the bumper beam, the casing being deformable relative to the frame;
    an electronic component housed in the casing, the electronic component including one of a powertrain control module and a positive temperature coefficient heater; and
    the casing elongated in an outboard direction extending away from the frame.

11. The vehicle frame of claim 10 wherein the casing is cantilevered from the first frame rail.

12. The vehicle frame of claim 10 wherein the wheel is disposed in the outboard direction relative to the frame.

13. The vehicle frame of claim 10 wherein the casing is comprised of metal.

14. The vehicle of claim 10 further comprising a bracket fixed to the casing and fixed to the frame.

15. The vehicle of claim 14 wherein the bracket is removably mounted to the frame.

16. The vehicle frame of claim 14 wherein the bracket defines at least one fastener hole.

\* \* \* \* \*